US011164462B2

United States Patent
Tonosaki

(10) Patent No.: US 11,164,462 B2
(45) Date of Patent: Nov. 2, 2021

(54) VEHICLE DISPATCH INSTRUCTION DEVICE, VEHICLE DISPATCH INSTRUCTION METHOD, AND RECORDING MEDIUM

(71) Applicant: TOYOTA JIDOSHA KABUSHIKI KAISHA, Toyota (JP)

(72) Inventor: Manabu Tonosaki, Edogawa-ku (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/540,190

(22) Filed: Aug. 14, 2019

(65) Prior Publication Data
US 2020/0126428 A1  Apr. 23, 2020

(30) Foreign Application Priority Data
Oct. 23, 2018  (JP) .............................. JP2018-199265

(51) Int. Cl.
*G08G 1/00* (2006.01)
*G06Q 10/04* (2012.01)
*G06Q 10/06* (2012.01)
*G06Q 30/02* (2012.01)

(52) U.S. Cl.
CPC ............. *G08G 1/202* (2013.01); *G06Q 10/04* (2013.01); *G06Q 10/063116* (2013.01); *G06Q 30/0202* (2013.01)

(58) Field of Classification Search
CPC ................................ G08G 1/202; G08G 1/20
USPC ......................................................... 340/994
See application file for complete search history.

(56) References Cited

U.S. PATENT DOCUMENTS

| 2002/0019760 | A1  | 2/2002 | Murakami et al. |
| 2012/0232943 | A1* | 9/2012 | Myr ............... G06Q 10/04 705/7.13 |
| 2018/0211186 | A1* | 7/2018 | Rakah ............. B60W 60/00253 |

FOREIGN PATENT DOCUMENTS

| JP | 2000-30193 A | 1/2000 |
| JP | 2000-132784 | 5/2000 |
| JP | 5685498 B2 | 3/2015 |
| JP | 2015-158830 A | 9/2015 |
| JP | 2017-134569 A | 8/2017 |

* cited by examiner

*Primary Examiner* — Kam Wan Ma
(74) *Attorney, Agent, or Firm* — Oblon, McClelland, Maier & Neustadt, L.L.P.

(57) ABSTRACT

A vehicle dispatch instruction device includes: a memory; and a processor including hardware. The processor is configured to: receive, from a plurality of movable bodies, position information of the movable bodies; receive actual demand information from information communication devices; select, from the plurality of movable bodies, a plurality of candidate movable bodies that are able to be dispatched to a plurality of locations included in the actual demand information; calculate expected travel times of the candidate movable bodies from their current positions to the locations; calculate an expected wait time of each user; determine combinations that minimize the sum of the users' expected wait times out of combinations of the locations and the candidate movable bodies; send a dispatch command to each target movable body; and repeat the selection, the calculation, and the determination at predetermined time intervals.

8 Claims, 12 Drawing Sheets

| | | | SHIN-KOKURITSU (PRIORITY LEVEL 3: TWO REQUESTED) | |
|---|---|---|---|---|
| | | | HOTEL A 18 MIN | DEPOT 35 MIN |
| | | | x | y |
| | | MIN | 300.18 | 300.35 | <3>
| | | COLUMN MAX | Inf | Inf |
| | | COLUMN MIN | 0 | 0 |
| | | RESULT (OVERWRITE) | 1 | 1 | <10>
| LOW | UPPER | CONSTRAINT NAME | | |
| 2 VEHICLES | 2 VEHICLES | SHIN-KOKURITSU | 1 VEHICLE | 1 VEHICLE | <6>
| 0 VEHICLES | 1 VEHICLE | HOTEL A | 1 = YES | | <9>
| 0 VEHICLES | 6 VEHICLES | DEPOT | | 1 = YES | <8>

| | | | SHIN-KOKURITSU (PRIORITY LEVEL 3: TWO REQUESTED) | | | |
|---|---|---|---|---|---|---|
| | | | DEPOT 35 MIN | VEHICLE A 8 MIN | VEHICLE B 25 MIN | |
| | | | x1 | x2 | x3 | |
| | | MIN | 300.35 | 300.08 | 300.25 | <3> |
| | | COLUMN MAX | Inf | Inf | Inf | |
| | | COLUMN MIN | 0 | 0 | 0 | |
| | | RESULT (OVERWRITE) | 0 | 1 | 1 | <10> |
| LOW | UPPER | CONSTRAINT NAME | | | | |
| <6> 2 VEHICLES | 2 VEHICLES | SHIN-KOKURITSU | 1 VEHICLE | 1 VEHICLE | 1 VEHICLE | |
| <8> 0 VEHICLES | 5 VEHICLES | DEPOT | 1 = YES | | | <9> |
| <7> 0 VEHICLES | 1 VEHICLE | VEHICLE A | | 1 = YES | | |
| 0 VEHICLES | 1 VEHICLE | VEHICLE B | | | 1 = YES | |

FIG. 11

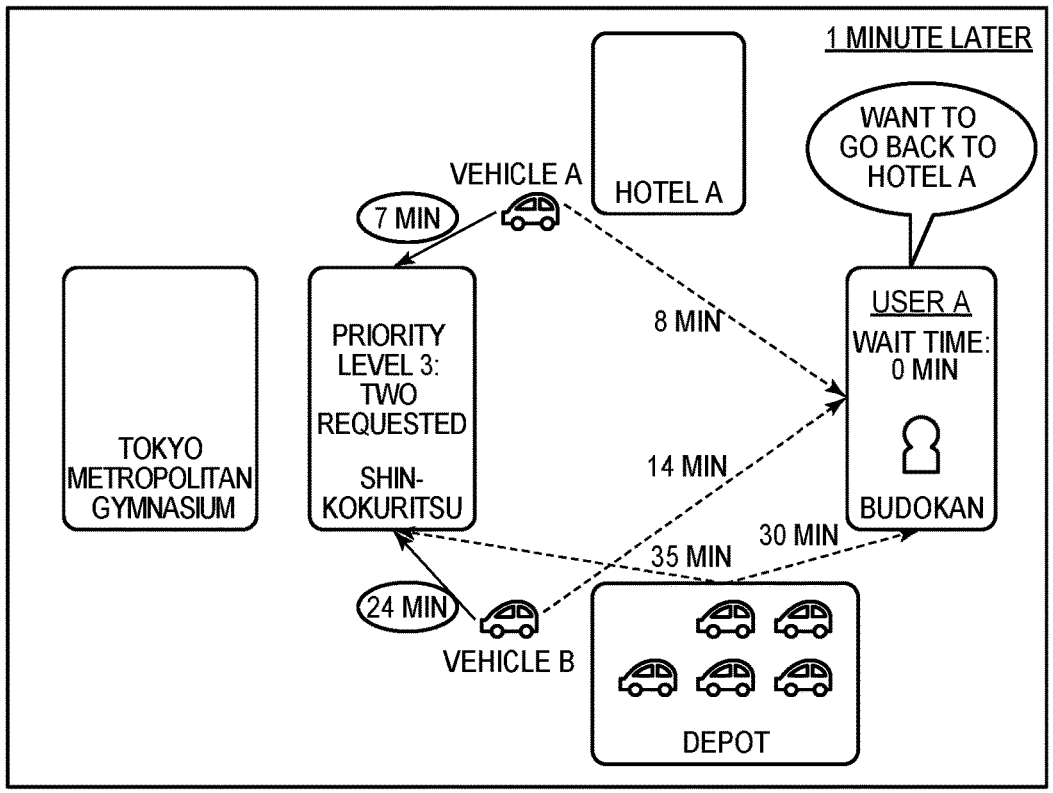

| | | | SHIN-KOKURITSU (PRIORITY LEVEL 3: TWO REQUESTED) | | | USER A (WAIT TIME: 0 MIN) | | | |
|---|---|---|---|---|---|---|---|---|---|
| | | | DEPOT 35 MIN | VEHICLE A 7 MIN | VEHICLE B 24 MIN | DEPOT 30 MIN | VEHICLE A 8 MIN | VEHICLE B 14 MIN | |
| | | <3> | xa | xb | xc | xd | xe | xf | |
| | | MIN | 300.35 | 300.07 | 300.24 | 30 MIN | 8 MIN | 14 MIN | <1> |
| | | COLUMN MAX | Inf | Inf | Inf | Inf | Inf | Inf | |
| | | COLUMN MIN | 0 | 0 | 0 | 0 | 0 | 0 | |
| | | RESULT (OVERWRITE) | 1 | 0 | 1 | 0 | 1 | 0 | <10> |
| LOW | UPPER | CONSTRAINT NAME | | | | | | | |
| <6> 2 VEHICLE | 2 VEHICLES | SHIN-KOKURITSU | 1 VEHICLE | 1 VEHICLE | 1 VEHICLE | 1 VEHICLE | 1 VEHICLE | 1 VEHICLE | |
| <4> 1 USER | 1 USER | A | | | | 1 USER | 1 USER | 1 USER | |
| <8> 0 VEHICLES | 5 VEHICLES | DEPOT | 1 = YES | | | 1 = YES | | | <9> |
| <7> 0 VEHICLES | 1 VEHICLE | VEHICLE A | | 1 = YES | | | 1 = YES | | |
| 0 VEHICLES | 1 VEHICLE | VEHICLE B | | | 1 = YES | | | 1 = YES | |

VEHICLE DISPATCH INSTRUCTION DEVICE, VEHICLE DISPATCH INSTRUCTION METHOD, AND RECORDING MEDIUM

INCORPORATION BY REFERENCE

The disclosure of Japanese Patent Application No. 2018-199265 filed on Oct. 23, 2018 including the specification, drawings and abstract is incorporated herein by reference in its entirety.

BACKGROUND

1. Technical Field

The present disclosure relates to vehicle dispatch instruction devices, vehicle dispatch instruction methods, and non-transitory readable recording media having a vehicle dispatch instruction program stored thereon.

2. Description of Related Art

Japanese Unexamined Patent Application Publication No. 2017-134569 (JP 2017-134569 A) discloses a vehicle dispatch instruction device that sends a dispatch command to a specific vehicle in response to a dispatch request from a user.

SUMMARY

The device disclosed in JP 2017-134569 A has the following problem. In case of unforeseen events, such as if a vehicle having received a dispatch command gets caught in traffic or if any trouble occurs to the driver of such a vehicle, the device needs to revise a dispatch plan, which increases the wait time of the user having made a dispatch request much more than originally planned.

The present disclosure provides a vehicle dispatch instruction device, a vehicle dispatch instruction method, and a non-transitory readable recording medium having a vehicle dispatch instruction program stored thereon, which restrain an increase in user's wait time even in case of unforeseen events.

A vehicle dispatch instruction device according to the present disclosure includes: a memory; and a processor including hardware. The processor is configured to receive, from a plurality of movable bodies configured to communicate with outside, position information of the movable bodies that is information on a current position of each movable body. The processor is configured to receive, from information communication devices corresponding to a plurality of locations that are dispatch destinations of the movable bodies, actual demand information including a time of a dispatch request made by each user and a location name. The processor is configured to select, from the plurality of movable bodies, a plurality of candidate movable bodies that are able to be dispatched to a plurality of the locations included in the actual demand information when the processor receives the actual demand information from the information communication devices. The processor is configured to calculate, based on the position information, expected travel times of the plurality of candidate movable bodies from their current positions to the plurality of locations. The processor is configured to calculate an expected wait time of each user based on the actual demand information and the expected travel times. The processor is configured to determine combinations that minimize a sum of the users' expected wait times out of combinations of the plurality of locations and the plurality of candidate movable bodies. The processor is configured to send a dispatch command to each target movable body that is a target to which the dispatch command is sent based on the determined combinations. The processor is configured to repeat at predetermined time intervals the selection of the plurality of candidate movable bodies, the calculation of the expected travel times, the calculation of the expected wait times, and the determination of the combinations.

In the vehicle dispatch instruction device according to the present disclosure, the processor may be configured to formulate a problem of determining the combinations of the plurality of locations and the plurality of candidate movable bodies as a linear programming problem in which an objective function is a sum of products of a plurality of variables representing the combinations of the plurality of locations and the plurality of candidate movable bodies multiplied by the users' expected wait times of each combination. The processor may be configured to determine the combinations that minimize the sum of the users' expected wait times by determining the variables that satisfy a first constraint and a second constraint and minimize the objective function. The first constraint is the number of movable bodies requested by the users, and the second constraint is the number of movable bodies that are able to be dispatched to the plurality of locations.

With this configuration, the combinations that minimizes the sum of the users' expected wait times can be easily determined by formulating the problem of determining the combinations of the plurality of locations and the plurality of candidate movable bodies as a linear programming problem and obtaining an optimal solution.

In the vehicle dispatch instruction device according to the present disclosure, the processor may be configured to generate potential demand information including the number of movable bodies that are potentially required at the locations and the location names. The processor may be configured to, when the processor receives the actual demand information from the information communication devices and generates the potential demand information, select a plurality of candidate movable bodies that are able to be dispatched to the plurality of locations included in the actual demand information and the potential demand information. The processor may be configured to calculate expected travel times of the plurality of candidate movable bodies from their current positions to the plurality of locations, based on the position information. The processor may be configured to calculate an actual demand cost, which is the expected wait time of each user, based on the actual demand information and the expected travel times. The processor may be configured to calculate a potential demand cost by adding a predetermined value larger than a maximum value of the actual demand costs to a value resulting from dividing the expected travel time to the location included in the potential demand information by a predetermined value indicating a weight of potential demand with respect to actual demand. The processor may be configured to formulate a problem of determining the combinations of the plurality of locations and the plurality of candidate movable bodies as a linear programming problem in which an objective function is a sum of products of a plurality of variables representing the combinations of the plurality of locations and the plurality of candidate movable bodies multiplied by the actual demand costs and the potential demand costs. The processor may be configured to determine the combinations that minimize the sum of the users' expected wait times by determining the variables that satisfy a first constraint and a second constraint and minimize the objective function. The first constraint is the number of movable bodies requested by the users and the number of movable bodies included in the potential demand information, and the second constraint is the number of movable bodies that are able to be dispatched to the plurality of locations.

With this configuration, the movable bodies are dispatched in view of the potential demands at each location. The vehicle dispatch instruction device can therefore deal with unexpected demands that occur at each location.

A vehicle dispatch instruction method according to the present disclosure is performed by using a vehicle dispatch instruction device including a processor. The vehicle dispatch instruction method includes: receiving, from a plurality of movable bodies configured to communicate with outside, position information of the movable bodies that is information on a current position of each movable body by using the processor; receiving, from information communication devices corresponding to a plurality of locations that are dispatch destinations of the movable bodies, actual demand information including a time of a dispatch request made by each user and a location name by using the processor; selecting, from the plurality of movable bodies, a plurality of candidate movable bodies that are able to be dispatched to a plurality of the locations included in the actual demand information by using the processor when the processor receives the actual demand information from the information communication devices; calculating, based on the position information, expected travel times of the plurality of candidate movable bodies from their current positions to the plurality of locations by using the processor; calculating an expected wait time of each user based on the actual demand information and the expected travel times and determining combinations that minimize a sum of the users' expected wait times out of combinations of the plurality of locations and the plurality of candidate movable bodies by using the processor; sending a dispatch command to each target movable body that is a target to which the dispatch command is sent based on the determined combinations by using the processor; and repeating at predetermined time intervals the selection of the plurality of candidate movable bodies, the calculation of the expected travel times, the calculation of the expected wait times, and the determination of the combinations by using the processor.

In a non-transitory readable recording medium in which a program for causing a processor to perform a method for controlling a vehicle dispatch instruction device including the processor according to the present disclosure is stored, the program causes the processor to perform a control process for controlling the vehicle dispatch instruction device. The control process includes: receiving, from a plurality of movable bodies configured to communicate with outside, position information of the movable bodies that is information on a current position of each movable body by using the processor; receiving, from information communication devices corresponding to a plurality of locations that are dispatch destinations of the movable bodies, actual demand information including a time of a dispatch request made by each user and a location name by using the processor; selecting, from the plurality of movable bodies, a plurality of candidate movable bodies that are able to be dispatched to a plurality of the locations included in the actual demand information by using the processor when the processor receives the actual demand information from the information communication devices; calculating, based on the position information, expected travel times of the plurality of candidate movable bodies from their current positions to the plurality of locations by using the processor; calculating an expected wait time of each user based on the actual demand information and the expected travel times and determining combinations that minimize a sum of the user's expected wait times out of combinations of the plurality of locations and the plurality of candidate movable bodies by using the processor; sending a dispatch command to each target movable body that is a target to which the dispatch command is sent based on the determined combinations by using the processor; and repeating at predetermined time intervals the selection of the plurality of candidate movable bodies, the calculation of the expected travel times, the calculation of the expected wait times, and the determination of the combinations by using the processor.

According to the present disclosure, specific movable bodies are not matched with dispatch requests from users, but the combinations of locations and movable bodies which minimize the sum of users' expected wait times are repeatedly calculated and determined at predetermined time intervals, and dispatch commands are sent to the movable bodies based on the determined combinations. Accordingly, in case of unforeseen events, such as if a movable body being sent to a certain location gets caught in traffic or if any trouble occurs to the driver of such a movable body, a different movable body located nearby can be sent to that location instead of that movable body. The present disclosure therefore can restrain an increase in wait time of the users and reduce the wait times of the users even in case of unforeseen events.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 11 shows the specific example of the vehicle dispatch instruction method that is performed by the vehicle dispatch instruction device according to the embodiment of the present disclosure, showing the state after 1 minute from FIG. 10.

DETAILED DESCRIPTION OF EMBODIMENTS

A vehicle dispatch instruction device, a vehicle dispatch instruction method, and a vehicle dispatch instruction program according to an embodiment will be described with reference to the accompanying drawings. Components of the embodiment include components that can be easily replaced by a person skilled in the art or that are substantially the same.

Vehicle Dispatch Instruction System

Figure 1:
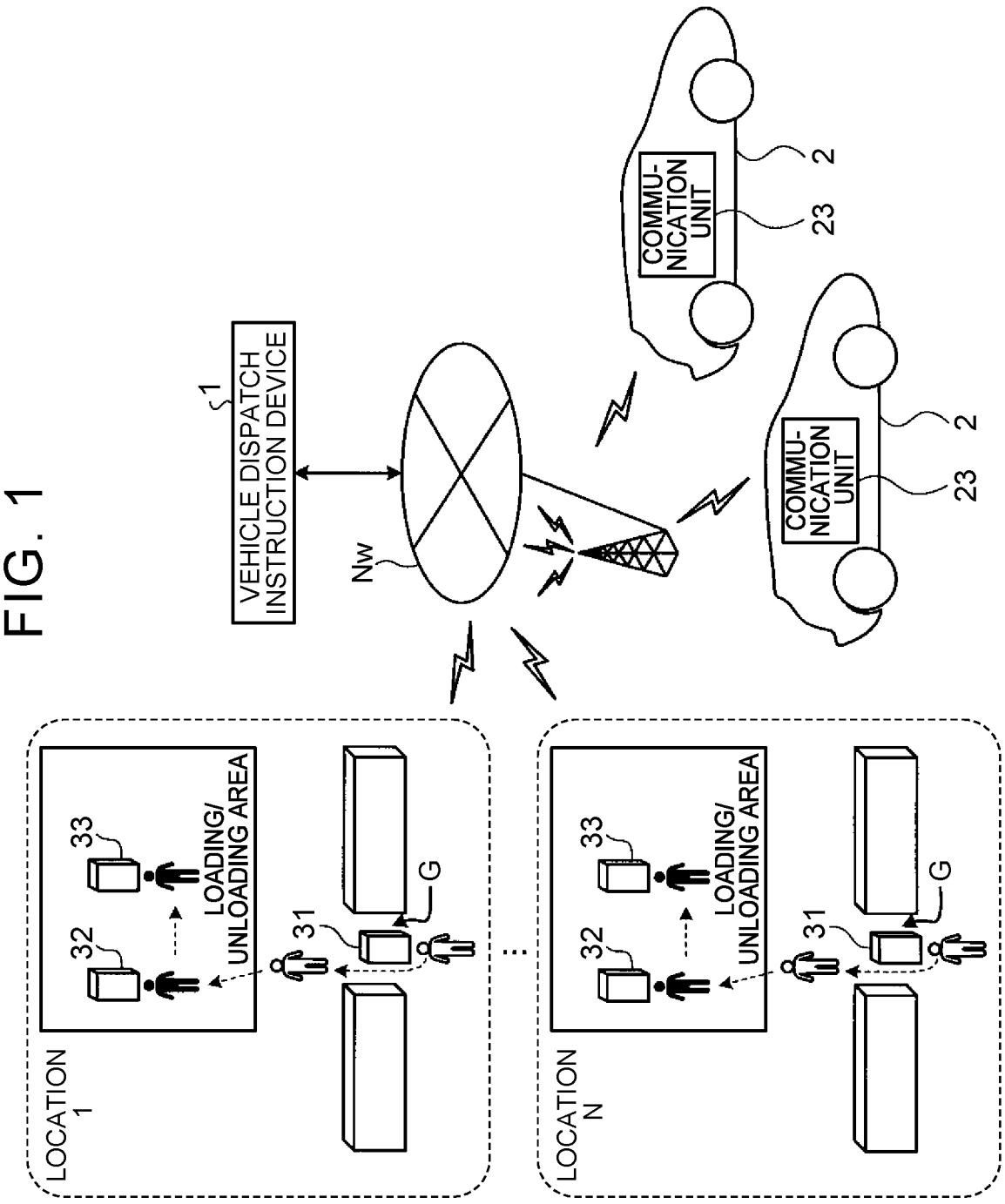
FIG. 1 is a schematic diagram of a vehicle dispatch instruction system to which a vehicle dispatch instruction device according to an embodiment of the present disclosure can be applied.

First, a vehicle dispatch instruction system to which the vehicle dispatch instruction device according to the embodiment can be applied will be described with reference to FIG. 1. The vehicle dispatch instruction system includes a vehicle dispatch instruction device 1, a plurality of vehicles (movable bodies) 2 each having a communication unit 23, a plurality of potential demand collection devices 31, a plurality of actual demand collection devices 32, and a plurality of riding status sending devices 33. The potential demand collection device 31, the actual demand collection device 32, and the riding status sending device 33 are provided at each of a plurality of locations. The vehicle dispatch instruction device 1 can communicate with the plurality of vehicles 2, the plurality of potential demand collection devices 31, the plurality of actual demand collection devices 32, and the plurality of riding status sending devices 33 via a network Nw.

The network Nw is, e.g., the Internet network, a mobile phone network, etc. The locations are places that are set in advance as dispatch origins or destinations from or to which the vehicles 2 are to be dispatched. The plurality of locations are set in the present embodiment. Examples of the locations include event venues, sports competition venues, sports practice fields, hotels, gas or hydrogen stations, vehicle depots where the vehicles 2 are on standby (hereinafter referred to as the depots), etc. It is herein assumed that the two locations shown in FIG. 1 are event venues. Each of these locations has an entrance gate G for entering the location and a loading/unloading area for getting in and out of the vehicles 2. The potential demand collection device 31, the actual demand collection device 32, and the riding status sending device 33 are provided as information communication devices at each location.

The potential demand collection device 31 is a device for collecting information on potential demands at the location. As used herein, the "potential demands" refers to potential demands for vehicle dispatch. More specifically, the "potential demands" means that there is no specific dispatch request from users but there is a possibility that dispatch requests may be made in the future.

Specific examples of the potential demands are (1) unexpected demands for vehicle dispatch at the location and (2) demands for vehicle dispatch expected after an event etc. is finished at the location. The potential demands (1) are unpredictable demands for vehicle dispatch, whereas the potential demands (2) are demands for vehicle dispatch which can be predicted to some extent from the schedule of an event that is held at the location, the number of event participants, etc.

Specifically, the potential demand collection device 31 collects information on the potential demands (2). The potential demands (1) are demands with higher priority over the potential demands (2). In the present embodiment, the potential demands (1) are defined as the "demands with priority level 2" and the potential demands (2) are defined as the "demands with priority level 3."

One example of the potential demand collection device 31 is a computer for security check which is installed at the entrance gate G of each location. In this case, the potential demand collection device 31 records each user's entry time to the location, namely the time each user entered the location through the entrance gate G. The potential demand collection device 31 sends, at e.g., predetermined time intervals, users' entry times during the time interval, the number of people who have entered the location during the time interval, and the location name to the vehicle dispatch instruction device 1. As described later, a potential demand generation unit 111 of the vehicle dispatch instruction device 1 generates potential demand information based on the users' entry times and the number of people who have entered the location.

The actual demand collection device 32 is a device for collecting information on actual demands at the location. As used herein, the "actual demands" refers to actual demands for vehicle dispatch. More specifically, the "actual demands" means that there are specific dispatch requests from users at the location.

One example of the actual demand collection device 32 is a computer for recording entries which is installed at the loading/unloading area in each location. In this case, the actual demand collection device 32 records each user's entry time to the loading/unloading area. Each time the actual demand collection device 32 records user's entry time to the loading/unloading area, it sends, as actual demand information, the user's entry time to the loading/unloading area, the number of people having entered the loading/unloading area, and the location name to the vehicle dispatch instruction device 1. The user's entry time included in the actual demand information is, in other words, the time the user made a dispatch request (dispatch request time) and the time the user started waiting at the loading/unloading area (wait start time). The actual demands are demands with higher priority over the potential demands. In the present embodiment, the actual demands are defined as the "demands with priority level 1."

One example of the riding status sending device 33 is a computer for sending a riding status which is installed at the loading/unloading area in each location. In this case, when a user gets in a vehicle 2, the riding status sending device 33 sends information that the user has gotten in the vehicle 2 to the vehicle dispatch instruction device 1. The riding status sending device 33 may have a function to accept a destination entry made by the user. In this case, the riding status sending device 33 sends, in addition to the information that the user has gotten in the vehicle 2, information on the user's destination to the vehicle dispatch instruction device 1.

The riding status sending device 33 can be implemented by, e.g., a smartphone or a tablet personal computer with a communication function which is owned by the driver of the vehicle 2. In this case, after the user gets in the vehicle 2, the driver of the vehicle 2 sends the riding status by manual entry. The riding status sending device 33 may be implemented by, e.g., an on-board navigation system with a communication function which is mounted on the vehicle 2. In this case, after the user gets in the vehicle 2, the on-board navigation system sends the riding status by motion detection using global positioning system (GPS).

The vehicle dispatch instruction device 1 manages each vehicle 2 based on three statuses, namely (1) on standby, (2) on the way, and (3) user on board. The status "on standby" means that the vehicle 2 with no user on board is on standby at any of the locations. The status "on the way" means that the vehicle 2 with no user on board is heading to a location in response to a dispatch command. The status "user on board" means that a user is riding in the vehicle 2. As described above, when the vehicle dispatch instruction device 1 receives the information that the user has gotten in the vehicle 2 from the riding status sending device 33 as described above, the vehicle dispatch instruction device 1 changes the status of this vehicle 2 from "on standby" or "on the way" to "user on board".

Vehicle Dispatch Instruction Device

Figure 2:
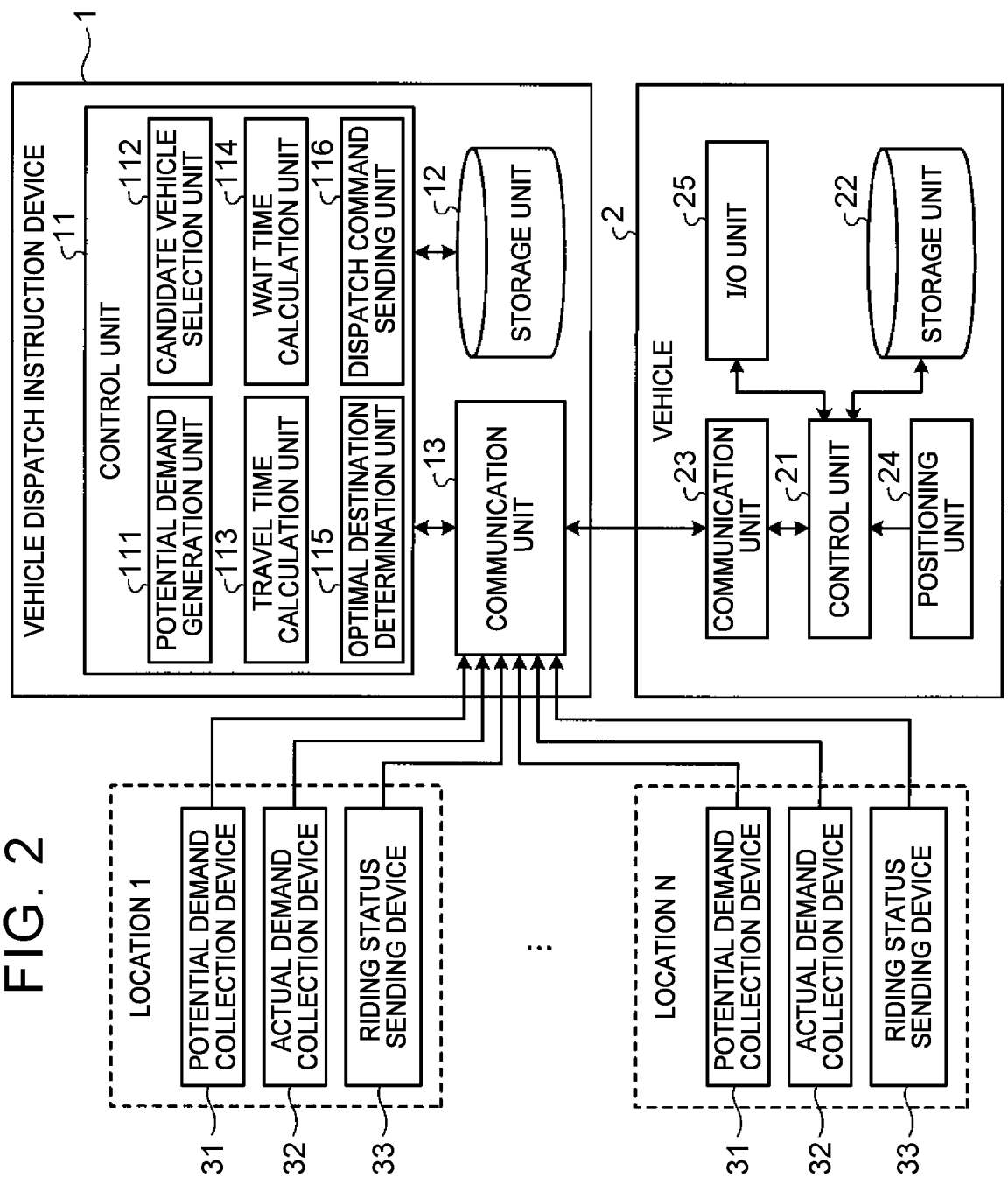
FIG. 2 is a block diagram schematically showing the configuration of the vehicle dispatch instruction device according to the embodiment of the present disclosure.

The configuration of the vehicle dispatch instruction device 1 according to the present embodiment will be described with reference to FIG. 2. The vehicle dispatch instruction device 1 includes a control unit 11, a storage unit 12, and a communication unit 13.

Specifically, the control unit 11 includes a processor comprised of a central processing unit (CPU), a digital signal processor (DSP), a field-programmable gate array (FPGA), etc., and a memory (main storage unit) comprised of a random access memory (RAM), a read only memory (ROM), etc. (all of them not shown).

The control unit 11 implements a function in accordance with a predetermined purpose by loading programs stored in the storage unit 12 into a working area of the main storage unit, executing the programs, and controlling each constituent unit etc. through the execution of the programs. The control unit 11 functions as a potential demand generation unit 111, a candidate vehicle selection unit 112, a travel time calculation unit 113, a wait time calculation unit 114, an optimal destination determination unit 115, and a dispatch command sending unit 116 through the execution of the programs. These units will be described in detail later.

The storage unit 12 is comprised of a recording medium such as an erasable programmable ROM (EPROM), a hard disk drive (HDD), and a removable medium. Examples of the removable medium include a universal serial bus (USB) memory, a disc recording medium such as a compact disc (CD), a digital versatile disc (DVD), or a Blu-ray (registered trademark) disc (BD), etc. The storage unit 12 can store therein an operating system (OS), various programs, various tables, various databases, etc.

The communication unit 13 is comprised of, e.g., a local area network (LAN) interface board, a wireless communication circuit for wireless communication, etc. The communication unit 13 is connected to the network Nw such as the Internet that is a public telecommunication network. The communication unit 13 connects to the network Nw to communicate with the vehicles 2.

Vehicle

Next, the configuration of the vehicle 2 to which the vehicle dispatch instruction device 1 according to the present embodiment sends a dispatch command will be described with reference to FIG. 2. The vehicle 2 is a vehicle (movable body) configured to communicate with the outside via the communication unit 23. The vehicle 2 runs between or among a plurality of locations that are set in advance as dispatch destinations and origins. The vehicle 2 includes a control unit 21, a storage unit 22, a communication unit 23, a positioning unit 24, and an input/output (I/O) unit 25.

The control unit 21 and the storage unit 22 are physically similar to the control unit 11 and the storage unit 12 described above. The control unit 21 controls overall operations of various components mounted on the vehicle 2. The communication unit 23 is comprised of, e.g., a data communication module (DCM) etc. and wirelessly communicates with the vehicle dispatch instruction device 1 via the network Nw.

The positioning unit 24 receives radio waves from global positioning system (GPS) satellites (not shown) to detect the current position of the vehicle 2. The positioning unit 24 sends the detected current position information to the vehicle dispatch instruction device 1 via the communication unit 23. The positioning unit 24 may detect the current position of the vehicle 2 by using, e.g., a combined method of light detection and ranging or laser imaging detection and ranging (LiDAR) and a three-dimensional digital map.

The I/O unit 25 is comprised of, e.g., a touch panel display, a speaker microphone, etc. The I/O unit 25 as an output unit displays characters, figures, etc. on the screen of the touch panel display or outputs a voice from the speaker microphone as controlled by the control unit 21 to send predetermined information to the outside. The I/O unit 25 as an input unit inputs predetermined information to the control unit 21 by the user operating the touch panel display or speaking to the speaker microphone. The vehicle 2 according to the present embodiment has the positioning unit 24 and the I/O unit 25 as separate functions. However, instead of the positioning unit 24 and the I/O unit 25, the vehicle 2 may have an on-board navigation system with a communication function which functions both as the positioning unit 24 and the I/O unit 25.

Vehicle Dispatch Instruction Method (Actual Demands)

A vehicle dispatch instruction method that is performed by the vehicle dispatch instruction device 1 will be described with reference to FIG. 3. An example in which the vehicle dispatch instruction device 1 sends dispatch commands based on actual demands, namely actual dispatch requests from users, will be described below.

First, the candidate vehicle selection unit 112 receives from the plurality of vehicles 2 current position information of the vehicles 2 via the communication unit 13 (step S1). Each vehicle 2 keeps sending its latest position information to the candidate vehicle selection unit 112.

Next, the candidate vehicle selection unit 112 determines whether it has received actual demand information from the actual demand collection devices 32 corresponding to a plurality of locations (step S2). When the candidate vehicle selection unit 112 has received actual demand information (Yes in step S2), it selects from the plurality of vehicles 2 a plurality of candidate vehicles that can be dispatched to a plurality of locations included in the actual demand information (step S3).

Specifically, in step S3, the candidate vehicle selection unit 112 checks the status of each vehicle 2 and selects the vehicles 2 other than those with the status "user on board," that is, the vehicles 2 with the status "on standby" or "on the way," as candidate vehicles. When the candidate vehicle selection unit 112 has not received actual demand information in step S2 (No in step S2), it detects the latest position information in step S1 and repeats step S2.

Based on the current position information of the plurality of candidate vehicles selected by the candidate vehicle selection unit 112, the travel time calculation unit 113 then calculates expected travel times of the plurality of candidate vehicles from their current positions to the plurality of locations (step S4).

Specifically, in step S4, the travel time calculation unit 113 calculates, based on aggregated traffic congestion information obtained from the travel record of each vehicle 2 and road restriction information from Vehicle Information and Communication System (VICS (registered trademark)), etc., travel routes to the locations avoiding traffic congestions and road restrictions and calculates expected travel times of the travel routes. When calculating the expected travel times, the travel time calculation unit 113 may correct the expected travel times as appropriate in view of the time required for the driver to rest, refuel the vehicle 2, make a stop while driving, etc.

Thereafter, the wait time calculation unit 114 calculates each user's expected wait time based on the current wait time of each user who has made a dispatch request and the expected travel times calculated by the travel time calculation unit 113 (step S5).

In step S5, the wait time calculation unit 114 first calculates "each user's current wait time" by subtracting the user's entry time (i.e., wait start time) included in the actual demand information received from the actual demand collection devices 32 from the current time. The wait time calculation unit 114 then calculates "each user's expected wait time" by adding the expected travel time calculated by the travel time calculation unit 113 to the user's current wait time.

Subsequently, the optimal destination determination unit 115 determines optimal destinations of the target vehicles 2 by determining the combinations that minimize the sum of the users' expected wait times out of the combinations of the plurality of locations and the plurality of candidate vehicles (step S6).

Specifically, the optimal destination determination unit 115 formulates the problem of determining the combinations of the plurality of locations and the plurality of candidate vehicles as a linear programming problem in which an objective function is the sum of the products of a plurality of variables representing the combinations of the plurality of locations and the plurality of candidate vehicles multiplied by the users' expected wait times of each combination. The optimal destination determination unit 115 determines the combinations that minimize the sum of the users' expected wait times by determining the variables that satisfy a first constraint and a second constraint and minimize the objective function. The first constraint is the number of vehicles 2 requested by the users, and the second constraint is the number of vehicles 2 that can be dispatched to the plurality of locations. Specific examples of the process that is performed by the optimal destination determination unit 115 will be described later (see FIGS. 4 to 12).

Lastly, the dispatch command sending unit 116 sends dispatch commands to the target vehicles 2 based on the combinations determined by the optimal destination determination unit 115. Each vehicle 2 provides the received dispatch command to the driver by, e.g., outputting (displaying) the dispatch command by the I/O unit 25.

Figure 3:
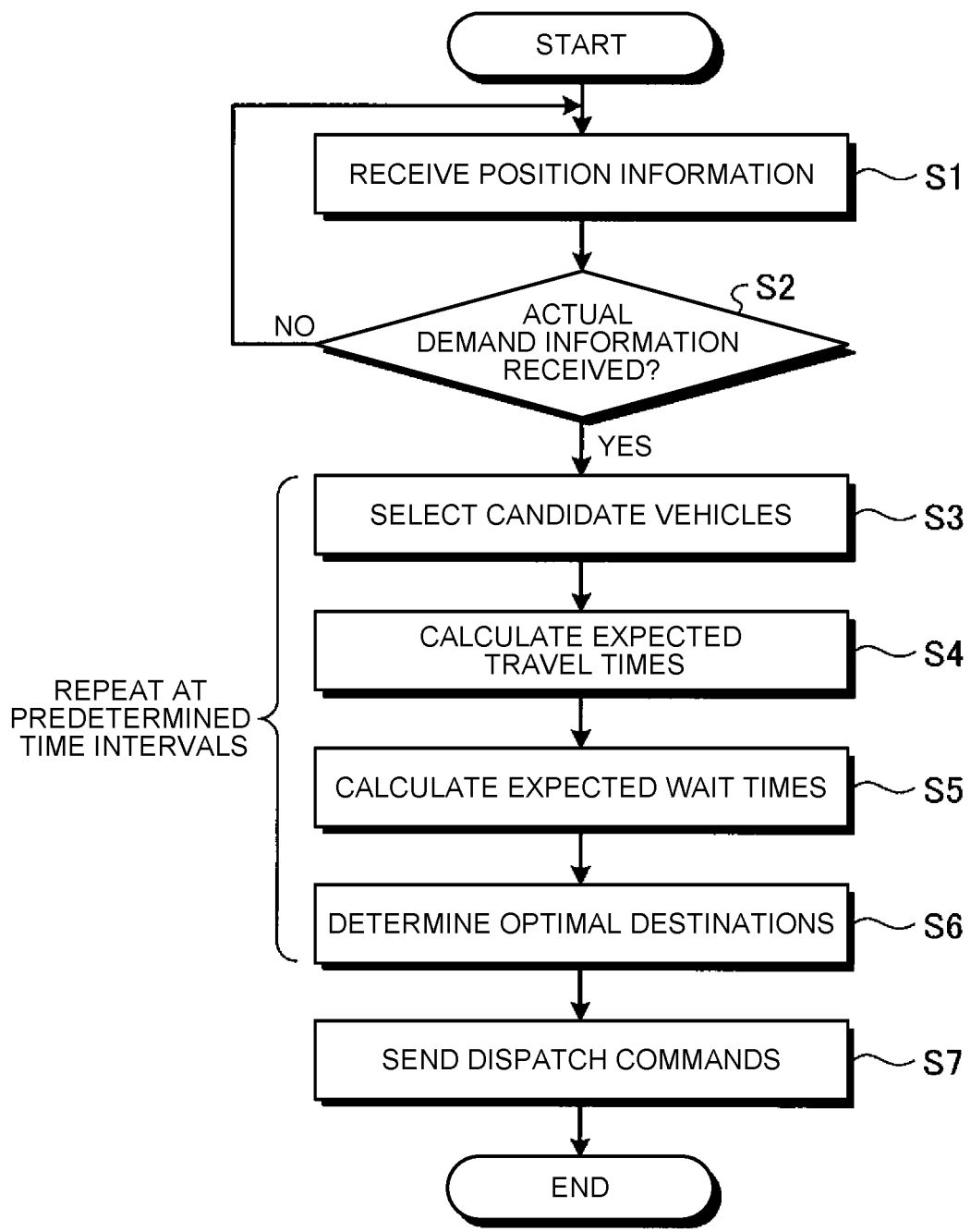
FIG. 3 is a flowchart illustrating the procedure of a vehicle dispatch instruction method that is performed by the vehicle dispatch instruction device according to the embodiment of the present disclosure.

As shown in FIG. 3, the vehicle dispatch instruction device 1 repeats selection of a plurality of candidate vehicles (step S3), calculation of expected travel times (step S4), calculation of expected wait times (step S5), and determination of the combinations (step S6) at predetermined time intervals (e.g., every one minute). That is, the vehicle dispatch instruction device 1 keeps calculating at predetermined time intervals the combinations of the locations and the vehicles 2 which minimize the sum of the users' expected wait times waiting at the locations, and based on the calculation results, sends dispatch commands to the target vehicles 2.

Vehicle Dispatch Instruction Method (Actual Demands and Potential Demands)

An example in which the vehicle dispatch instruction device 1 sends dispatch commands based on actual demands that are actual dispatch requests from users and potential demands will be described.

The candidate vehicle selection unit 112 first receives from the plurality of vehicles 2 current position information of the vehicles 2 via the communication unit 13.

Next, the potential demand generation unit 111 generates potential demand information on the "demands with priority level 2" (hereinafter referred to as the "first potential demand information) and potential demand information on the "demands with priority level 3" (hereinafter referred to as the "second potential demand information").

The potential demand generation unit 111 generates the first potential demand information based on, e.g., the minimum number of standby vehicles 2 (set value) set for each location. The first potential demand information includes the name of each dispatch destination location, the number of vehicles 2 to be dispatched (required number of vehicles 2 to be added) to each dispatch destination location, and the arrival times of the vehicles 2 at each dispatch destination location (adding timings). The "adding timing" is set to any desired time the dispatched vehicle 2 can arrive at the dispatch destination location.

The potential demand generation unit 111 also generates the second potential demand information based on users' entry times to the location and the number of people who have entered the location which are received from each potential demand collection device 31. The second potential demand information includes the name of each dispatch destination location, the number of vehicles 2 to be dispatched (required number of vehicles 2 to be sent) to each dispatch destination location, and the arrival times of the vehicles 2 at each dispatch destination location (sending timings). The "required number of vehicles 2 to be sent" can be calculated by the following expression (1), and the "sending timing" can be calculated by the following expression (2).

The required number of vehicles 2 to be sent=the number of people who have entered the location/[K1]  (1)

(where K1 represents a constant calculated from the number of remaining events to be held at the location).

The sending timing=event end time at the location−[K2]  (2)

(where K2 represents an expected travel time to the location×a predetermined safety factor+a predetermined safety time).

Since potential demands can be calculated by various methods, the above method for calculating the required number of vehicles 2 to be sent is merely an example. For example, the required number of vehicles to be sent may be a value resulting from dividing the number of people who have entered the location by the average number of passengers per vehicle 2. Alternatively, the required number of vehicles to be sent may be calculated also in view of a safety factor according to the availability of resources so that an extra number of vehicles are sent. Users' wait times can therefore be reduced accordingly.

If the candidate vehicle selection unit 112 has received actual demand information from the actual demand collection devices 32 and the potential demand generation unit 111 has generated the first or second potential demand information, the candidate vehicle selection unit 112 then selects from the plurality of vehicles 2 a plurality of candidate vehicles that can be dispatched to a plurality of locations included in the actual demand information and the potential demand information.

Thereafter, based on the current position information of the plurality of candidate vehicles selected by the candidate vehicle selection unit 112, the travel time calculation unit 113 calculates expected travel times of the plurality of candidate vehicles from their current positions to the plurality of locations included in the actual demand information and the potential demand information.

The wait time calculation unit 114 then calculates an "actual demand cost," namely each user's expected wait time, based on the current wait time of each user who has made a dispatch request and the expected travel times calculated by the travel time calculation unit 113.

Subsequently, the optimal destination determination unit 115 calculates a "potential demand cost" by adding a predetermined value larger than the maximum value of the actual demand costs to a value resulting from dividing the expected travel time to the location included in the potential demand information by a predetermined value indicating the weight of potential demand with respect to actual demand.

The optimal destination determination unit 115 then formulates the problem of determining the combinations of the plurality of locations and the plurality of candidate vehicles as a linear programming problem in which an objective function is the sum of the products of a plurality of variables representing the combinations of the plurality of locations and the plurality of candidate vehicles multiplied by the actual demand costs and the potential demand costs. The optimal destination determination unit 115 determines the combinations that minimize the sum of the users' expected wait times by determining the variables that satisfy a first constraint and a second constraint and minimize the objective function. The first constraint is the number of vehicles 2 requested by the users and the number of vehicles 2 included in the potential demand information, and the second constraint is the number of vehicles 2 that can be dispatched to the plurality of locations. The optimal destination determination unit 115 thus determines the optimal destinations of the target vehicles 2.

Lastly, the dispatch command sending unit 116 sends dispatch commands to the target vehicles 2 based on the combinations determined by the optimal destination determination unit 115. Each vehicle 2 provides the received dispatch command to the driver by, e.g., outputting (displaying) the dispatch command by the I/O unit 25.

EXAMPLES

Specific examples of the vehicle dispatch instruction method that is performed by the vehicle dispatch instruction device 1 according to the present embodiment will be described with reference to FIGS. 4 to 12. The diagrams on the upper side in FIGS. 4 to 11 visually show the flow of the vehicle dispatch instruction method. The tables on the lower side in FIGS. 4 to 11 are matrices for solving a linear programming problem when performing the vehicle dispatch instruction method and show costs and constraints for combination minimization.

It is herein assumed that the combination minimization using the linear programming as described in the examples is performed by using the following processes <1> to <11>. In FIGS. 4 to 11, the numbers in angle brackets shown on both sides of the table on the lower side of the figure correspond to the processes <1> to <11>.

<1> Costs of demands with priority level 1 at each location (actual demand costs): calculated by "current time−start wait time+expected travel time."

<2> Costs of demands with priority level 2 at each location (potential demand costs): calculated by "$T_{2a}$ (min)+expected travel time/$T_{2b}$." $T_{2a}$ is set to a "value larger than the maximum value of actual demand costs (expected wait time=expected travel time and current wait time)." $T_{2b}$ is set to a predetermined "value indicating the weight of potential demand with respect to actual demand." For example, in the case where $T_{2b}$ is set to "100," "1 minute" of expected wait time of actual demand corresponds to "100 minutes" of expected wait time of potential demand. The value "100" is a value close to the maximum value of the expected travel times, is a nice round number that can be easily calculated (debugged) by the control unit 11, and is an appropriate value that can avoid loss of significant digits in the control unit 11.

<3> Costs of demands with priority level 3 at each location (potential demand costs): calculated by "$T_{3a}$ (min)+expected travel time/$T_{3b}$." $T_{3a}$ is set to a "value larger than the maximum value of actual demand costs (expected wait time=expected travel time+current wait time)" and larger than $T_{2a}$. $T_{3a}$ being set to a value larger than $T_{2a}$ indicates that the priority level of potential demand with priority level 3 is lower than that of potential demand with priority level 2. Like $T_{2b}$, $T_{3b}$ is set to a predetermined "value indicating the weight of potential demand with respect to actual demand."

<4> Constraint for demand with priority level 1 (actual demand) (first constraint): "$X_{ad}=1$," where $X_{ad}$ represents each actual demand.

<5> Constraint for demand with priority level 2 (potential demand): "$X_{pa}$=the required number of vehicles to be added," where $X_{pa}$ represents each potential demand.

<6> Constraint for demand with priority level 3 (potential demand): "$X_{pb}$=the required number of vehicles to be sent," where $X_{pb}$ represents each potential demand.

<7> Constraint on the number of vehicles 2 moving between locations (second constraint): "$0 \leq X_{sa} \leq 1$," where $X_{sa}$ represents the number of vehicles 2.

<8> Constraint on the number of vehicles 2 on standby at a location (second constraint): "$0 \leq X_{sb} \leq$ the number of standby vehicles," where $X_{sb}$ represents the number of vehicles 2.

<9> Regarding each variable indicating the combinations of the plurality of candidate vehicles and the plurality of locations, "1=YES", etc. is shown for any constraint that applies to that variable, and a portion for any constraint that does not apply to that variable is left blank.

<10> The value of each variable of the combinations selected as an optimal solution is the "number of vehicles 2" required by the user and "0" means non-applicable. The locations included in the combinations selected as the optimal solution are determined to be optimal destinations.

<11> If the status of any target vehicle 2 is on standby or on the way to a different destination, an optimal destination is sent to the I/O unit 25 of that vehicle 2.

Figure 4:
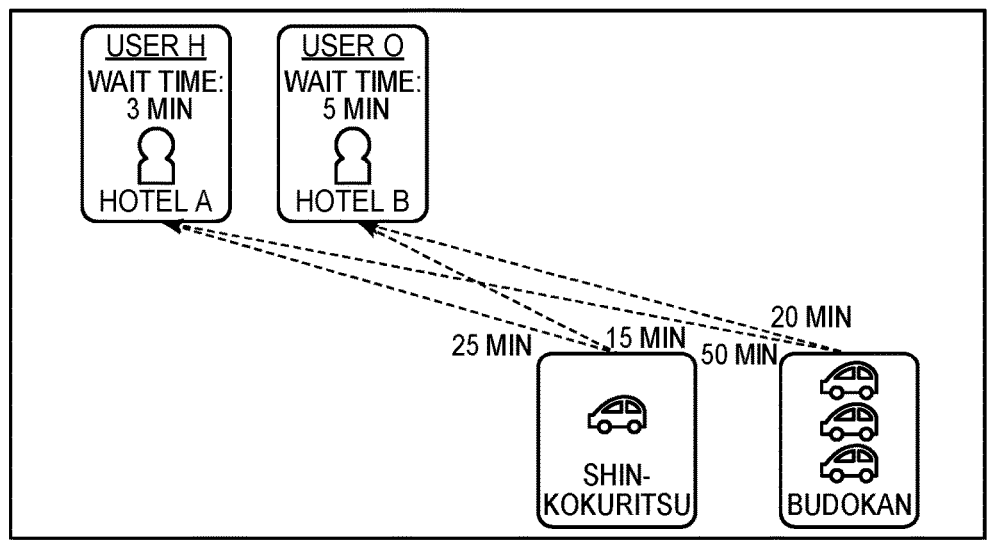
FIG. 4 shows a specific example of the vehicle dispatch instruction method that is performed by the vehicle dispatch instruction device according to the embodiment of the present disclosure, showing how a plurality of vehicles are dispatched in response to dispatch requests (actual demands) from users at a plurality of locations and also showing a table indicating costs, constraints, etc. for combination minimization using linear programming.

First, an example in which the vehicle dispatch instruction device 1 sends dispatch commands based on actual demands from users will be described with reference to FIGS. 4 to 8. The diagram on the upper side in FIG. 4 shows the case where two users (User H, User O) at two locations (Hotel A, Hotel B) have made a dispatch request via the actual demand collection devices 32. The current wait time of User H is 3 minutes, and the current wait time of User O is 5 minutes. A total of four vehicles 2 are on standby at two locations (Shin-Kokuritsu, Budokan) other than the above two locations (one at Shin-Kokuritsu and three at Budokan).

At the time of FIG. 4, the candidate vehicle selection unit 112 receives actual demand information from the actual demand collection devices 32 and selects four candidate vehicles (the vehicles 2 on standby at Shin-Kokuritsu and Budokan) that can be dispatched to the two locations (Hotel A, Hotel B). The travel time calculation unit 113 then calculates expected travel time from Shin-Kokuritsu to Hotel A as "25 minutes," expected travel time from Shin-Kokuritsu to Hotel B as "15 minutes," expected travel time from Budokan to Hotel A as "50 minutes," and expected travel time from Budokan to Hotel B as "20 minutes." The wait time calculation unit 114 then calculates that the expected wait time of User H is "28 minutes" if the vehicle 2 on standby at Shin-Kokuritsu is dispatched to Hotel A, the expected wait time of User O is "20 minutes" if the vehicle 2 on standby at Shin-Kokuritsu is dispatched to Hotel B, the expected wait time of User H is "53 minutes" if the vehicle 2 on standby at Budokan is dispatched to Hotel A, and the expected wait time of User O is "25 minutes" if the vehicle 2 on standby at Budokan is dispatched to Hotel B.

Thereafter, the optimal destination determination unit 115 calculates the following objective function according to <1>.

Objective Function=28v+53w+20x+25y (minimization)

The optimal destination determination unit 115 then sets the following constraints according to <4>.

Constraint for User H: v+w=1
Constraint for User O: x+y=1

Subsequently, the optimal destination determination unit 115 sets the following constraints according to <8>.

Constraint on the number of vehicles 2 on standby at Shin-Kokuritsu: $0 \leq v+x \leq 1$ Constraint on the number of vehicles 2 on standby at Budokan: $0 \leq w+y \leq 3$ The optimal destination determination unit 115 then calculates according to <10> the variables "v, y" satisfying the constraints of <4> and <8> and minimizing the objective function of <1> as an optimal solution as follows.

Optimal solution: v=1, w=0, x=0, y=1

Lastly, the dispatch command sending unit 116 sends the following dispatch commands to the vehicles 2 according to <11>.

A command to dispatch the vehicle 2 on standby at Shin-Kokuritsu to "Hotel A (current location of User H)
A command to dispatch one of the vehicles 2 on standby at Budokan to "Hotel B (current location of User O)

Figure 5:
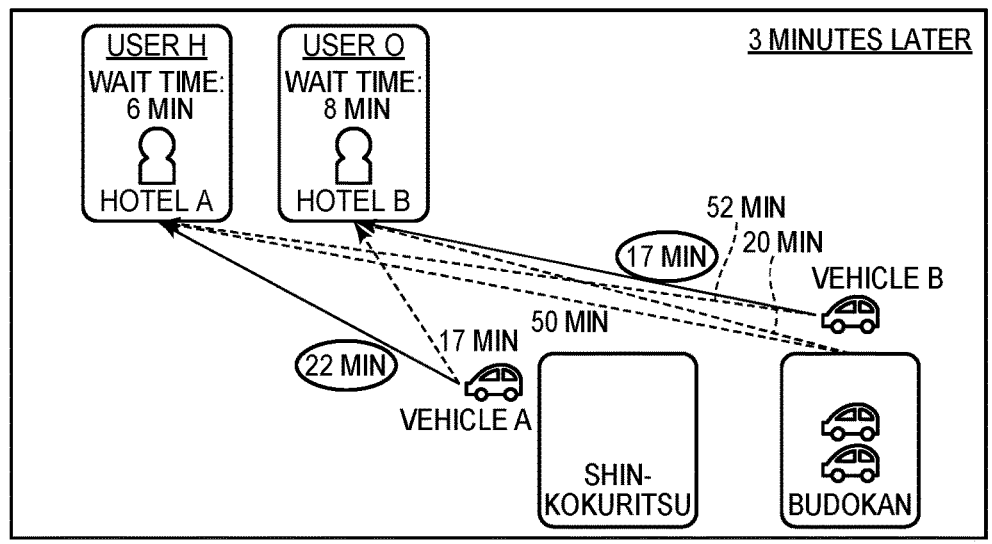
FIG. 5 shows the specific example of the vehicle dispatch instruction method that is performed by the vehicle dispatch instruction device according to the embodiment of the present disclosure, showing the state after 3 minutes from FIG. 4.

FIG. 5 shows the state after 3 minutes from FIG. 4. As shown in the figure, Vehicle A having departed from Shin-Kokuritsu is heading to Hotel A and Vehicle B having departed form Budokan is heading to Hotel B.

At the time of FIG. 5, the candidate vehicle selection unit 112 selects four candidate vehicles (Vehicle A, Vehicle B, and the two vehicles 2 on standby at Budokan) that can be dispatched to the two locations (Hotel A, Hotel B). The travel time calculation unit 113 then recalculates expected travel times of the four candidate vehicles to the two locations. The wait time calculation unit 114 then recalculates the expected wait times of the two users (User H, User O).

Thereafter, the optimal destination determination unit 115 recalculates an optimal solution of the combinations of the four candidate vehicles and the two locations. The optimal solution thus recalculated is the same combinations "Vehicle A to Hotel A (User H)" and "Vehicle B to Hotel B (User O)" as in FIG. 4 (3 minutes ago). The dispatch command sending unit 116 therefore does not send any route change command etc. That is, if the recalculated optimal solution is the same combinations as the last time, the vehicle dispatch instruction device 1 does nothing in particular.

Figure 6:
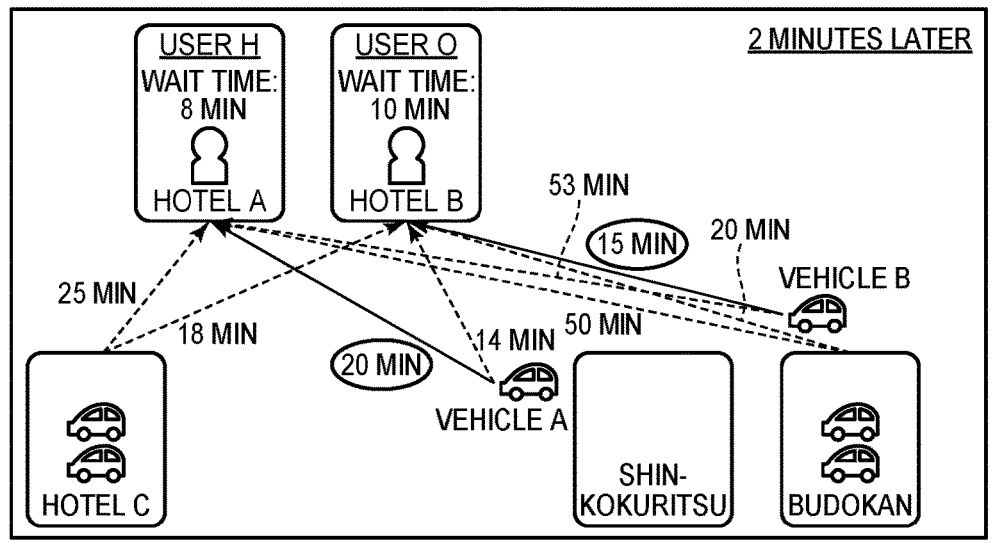
FIG. 6 shows the specific example of the vehicle dispatch instruction method that is performed by the vehicle dispatch instruction device according to the embodiment of the present disclosure, showing the state after 2 minutes from FIG. 5.

FIG. 6 shows the state after 2 minutes from FIG. 5. As shown in the figure, Vehicle A is still heading to Hotel A and Vehicle B is still heading to Hotel B. In FIG. 6, two new vehicles 2 have become available because, e.g., these two vehicles 2 dropped off users at Hotel C. A row and columns corresponding to "Hotel C" are therefore added to the table as shown by Part a in the table on the lower side in FIG. 6.

At the time of FIG. 6, the candidate vehicle selection unit 112 selects six candidate vehicles (Vehicle A, Vehicle B, the two vehicles 2 on standby at Budokan, and the two vehicles 2 on standby at Hotel C) that can be dispatched to the two locations (Hotel A, Hotel B). The travel time calculation unit 113 then recalculates expected travel times of the six candidate vehicles to the two locations (Hotel A, Hotel B).

Subsequently, the wait time calculation unit 114 recalculates expected wait times of the two users (User H, User O). The optimal destination determination unit 115 then recalculates an optimal solution of the combinations of the six candidate vehicles and the two locations. The optimal solution thus recalculated is the same combinations "Vehicle A→Hotel A (User H)" and "Vehicle B→Hotel B (User O)" as in FIG. 5 (2 minutes ago). The dispatch command sending unit 116 therefore does not send any route change command etc.

Figure 7:
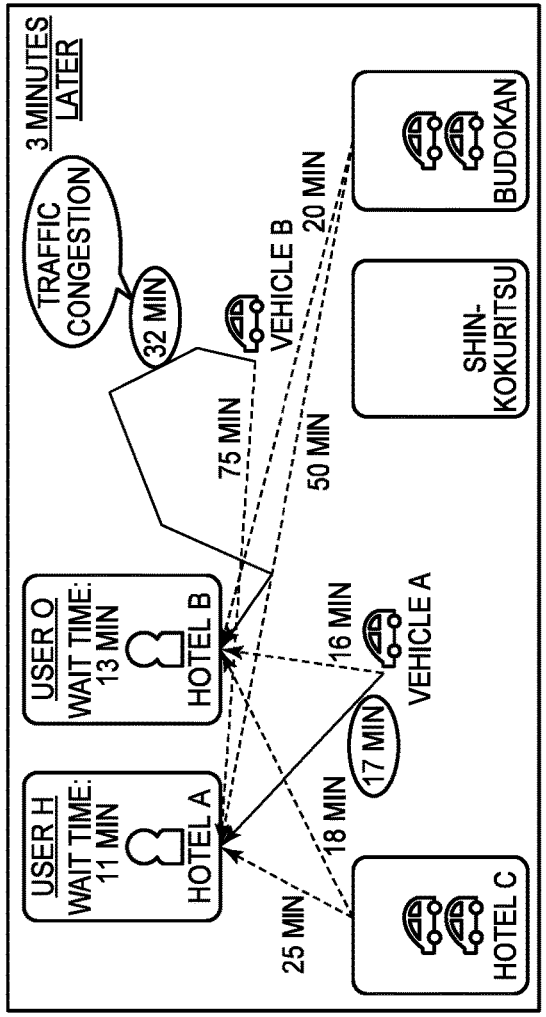
FIG. 7 shows the specific example of the vehicle dispatch instruction method that is performed by the vehicle dispatch instruction device according to the embodiment of the present disclosure, showing the state after 3 minutes from FIG. 6.

FIG. 7 shows the state after 3 minutes from FIG. 6. As shown in the figure, Vehicle A is still heading toward Hotel A and Vehicle B is still heading toward Hotel B. In FIG. 7, Vehicle B is stuck in traffic and has selected a different route in order to avoid the traffic congestion.

At the time of FIG. 7, the candidate vehicle selection unit 112 selects six candidate vehicles (Vehicle A, Vehicle B, the two vehicles 2 on standby at Budokan, and the two vehicles 2 on standby at Hotel C) that can be dispatched to the two locations (Hotel A, Hotel B). The travel time calculation unit 113 then recalculates expected travel times of the six candidate vehicles to the two locations. In this case, the travel time calculation unit 113 calculates that the expected travel time of Vehicle B stuck in traffic is "32 minutes." The wait time calculation unit 114 then recalculates expected wait times of the two users (User H, User O). In this case, the wait time calculation unit 114 calculates that the expected wait time of User H is "86 minutes" if Vehicle B is dispatched to Hotel A and the expected wait time of User O is "45 minutes" if Vehicle B is dispatched to Hotel B.

Subsequently, the optimal destination determination unit 115 recalculates an optimal solution of the combinations of the six candidate vehicles and the two locations. The optimal solution thus recalculated is different from that in FIG. 6 (3 minutes ago), namely is the combinations "Vehicle A→Hotel A (User H)" and "Vehicle 2 at Hotel C→Hotel B (User O)" (see Part b in the table on the lower side in FIG. 7). The dispatch command sending unit 116 therefore sends a dispatch command to the vehicle 2 on standby at Hotel C so that this vehicle 2 leaves for Hotel B. In this case, since no route change command etc. is sent to Vehicle B, Vehicle B keeps heading to Hotel B.

Figure 8:
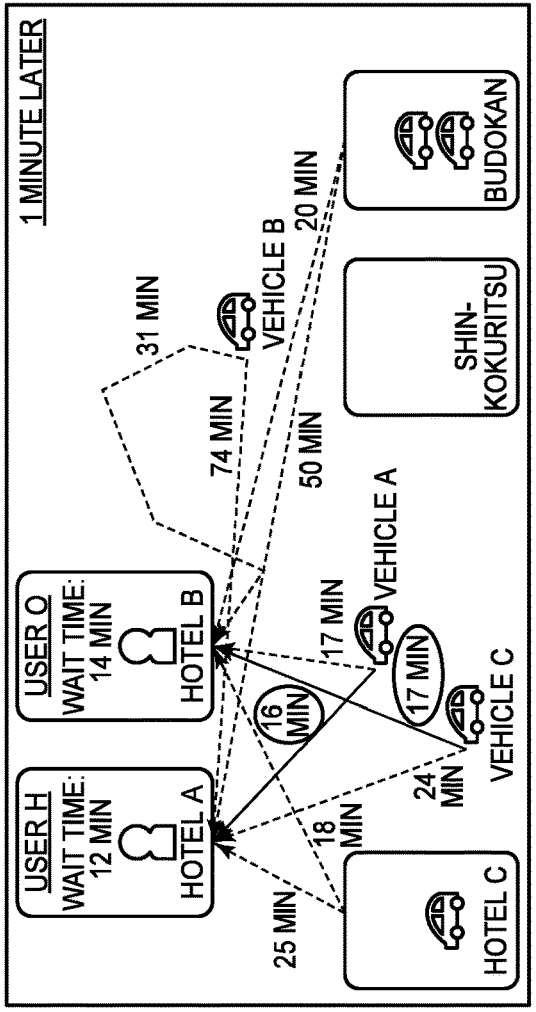
FIG. 8 shows the specific example of the vehicle dispatch instruction method that is performed by the vehicle dispatch instruction device according to the embodiment of the present disclosure, showing the state after 1 minute from FIG. 7.

FIG. 8 shows the state after 1 minute from FIG. 7. As shown in FIG. 7, Vehicle A is still heading to Hotel A, and Vehicle B and Vehicle C having left Hotel C are still heading to Hotel B.

At the time of FIG. 8, the candidate vehicle selection unit 112 selects six candidate vehicles (Vehicle A, Vehicle B, Vehicle C, the two vehicles 2 on standby at Budokan, and the vehicle 2 on standby at Hotel C) that can be dispatched to the two locations (Hotel A, Hotel B). The travel time calculation unit 113 then recalculates expected travel times of the six candidate vehicles to the two locations.

Subsequently, the wait time calculation unit 114 recalculates expected wait times of the two users (User H, User O). The optimal destination determination unit 115 then recalculates an optimal solution of the combinations of the six candidate vehicles and the two locations. The optimal solution thus recalculated is the combinations "Vehicle A→Hotel A (User H)" and "Vehicle C→Hotel B (User O)" as in FIG. 7 (1 minute ago). The dispatch command sending unit 116 therefore does not send any route change command etc.

Figure 9:
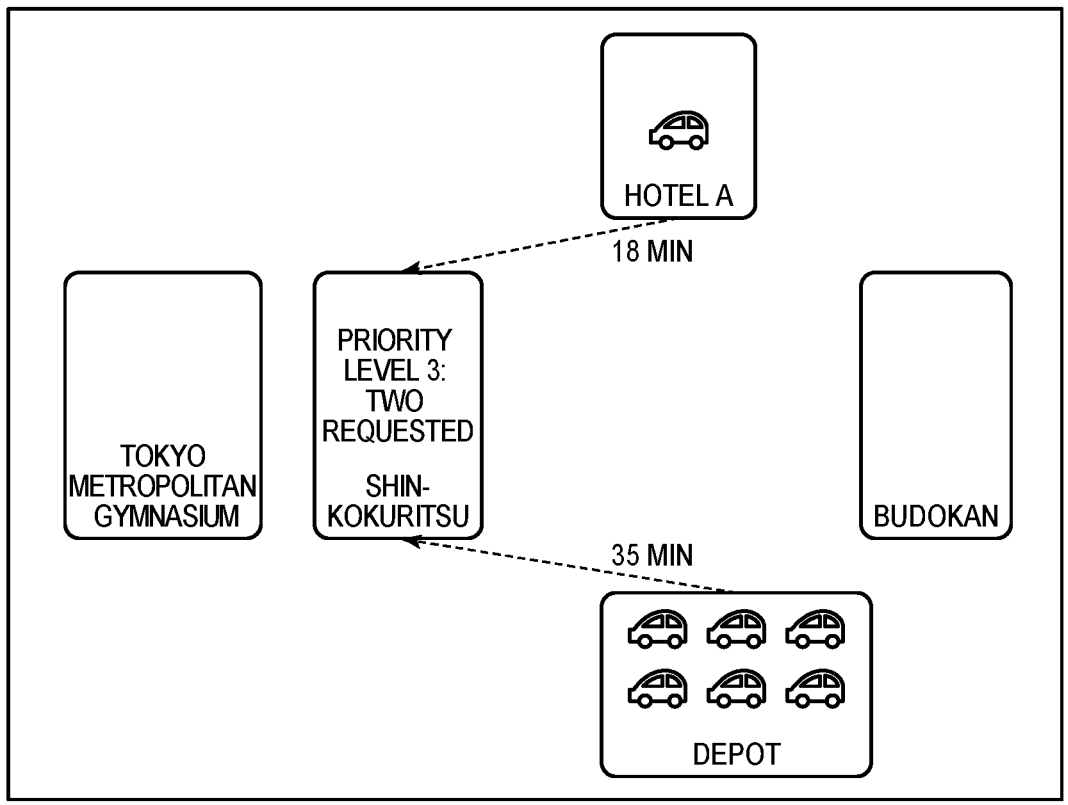
FIG. 9 shows a specific example of the vehicle dispatch instruction method that is performed by the vehicle dispatch instruction device according to the embodiment of the present disclosure, showing how a plurality of vehicles are dispatched for potential demands at a plurality of locations and also showing a table indicating costs, constraints, etc. for combination minimization using linear programming.

Next, an example in which the vehicle dispatch instruction device 1 sends dispatch commands based on actual demands that are actual dispatch requests from users and potential demands will be described with reference to FIGS. 9 to 12. The diagram on the upper side in FIG. 9 shows the case where two vehicles 2 are to be added to one location (Shin-Kokuritsu) in preparation for high demand after an event. A total of seven vehicles 2 are on standby at two locations (Hotel A, depot) other than this location (one at Hotel A and six at the depot).

At the time of FIG. 9, the potential demand generation unit 111 generates second potential demand information including "the required number of vehicles to be sent: 2." The candidate vehicle selection unit 112 then selects seven candidate vehicles (the vehicles 2 on standby at Hotel A and the depot) that can be dispatched to one location (Shin-Kokuritsu). The travel time calculation unit 113 then calculates that the expected travel time from Hotel A to Shin-Kokuritsu is "18 minutes" and the expected travel time from the depot to Shin-Kokuritsu is "35 minutes."

Subsequently, the optimal destination determination unit 115 calculates potential demand costs and an objective function according to <3>. The potential demand costs are costs regarding the potential demands with priority level 3 and are calculated by the following expression (3).

$$\text{Potential demand cost} = T_{3a} + \text{expected travel time}/T_{3b} \quad (3)$$

In the expression (3), $T_{3a}$ is set to a "value larger than the maximum value of actual demand costs" and larger than $T_{2a}$ in <2>. Setting $T_{3a}$ to such a large value make the combinations of candidate vehicles and locations according to potential demands less likely to be selected than the combinations of candidate vehicles and locations according to actual demands. $T_{3b}$ is set to a predetermined "value indicating the weight of potential demand with respect to actual demand."

In the case where $T_{3a}$ in the expression (3) is "300" and $T_{3b}$ is "100," the optimal destination determination unit 115 calculates potential demand costs and an objective function as follows. The following values of $T_{3a}$, $T_{3b}$ are merely an example, and $T_{3a}$, $T_{3b}$ are not limited to these values.

Potential demand cost for Hotel A to Shin-Kokuritsu: "300+18/100=300.18"

Potential demand cost for the depot to Shin-Kokuritsu: "300+35/100=300.35"

Objective function: 300.18x+300.35y (minimization)

Subsequently, the optimal destination determination unit 115 sets the following constraint according to <6>.

Required number of vehicles to be sent: x+y=2

The optimal destination determination unit 115 then sets the following constraints according to <8>.

Constraint on the number of vehicles 2 on standby at Hotel A: 0≤x≤1

Constraint on the number of vehicles 2 on standby at the depot: 0≤y≤6

The optimal destination determination unit 115 then calculates according to <10> the variables "x, y" satisfying the constraints of <6> and <8> and minimizing the objective function of <3> as an optimal solution as follows.

Optimal solution: x=1, y=1

Lastly, the dispatch command sending unit 116 sends the following dispatch commands to the vehicles 2 according to <11>.

A command to dispatch the vehicle 2 on standby at Hotel A to "Shin-Kokuritsu"

A command to dispatch one of the vehicles 2 on standby at the depot to "Shin-Kokuritsu"

Figure 10:
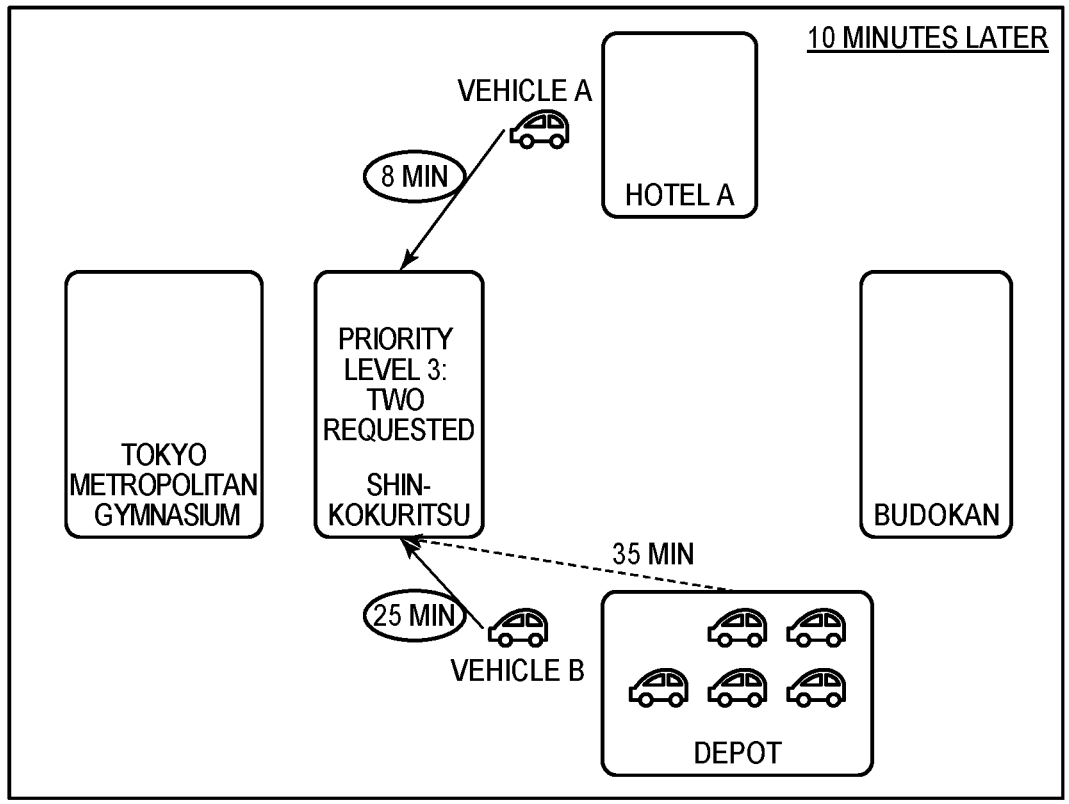
FIG. 10 shows the specific example of the vehicle dispatch instruction method that is performed by the vehicle dispatch instruction device according to the embodiment of the present disclosure, showing the state after 10 minutes from FIG. 9.

FIG. 10 shows the state after 10 minutes from FIG. 9. As shown in the figure, Vehicle A having departed from Hotel A and Vehicle B having departed from the depot are heading to Shin-Kokuritsu.

At the time of FIG. 10, the candidate vehicle selection unit 112 selects seven candidate vehicles (Vehicle A, Vehicle B, and the five vehicles 2 on standby at the depot) that can be dispatched to the single location (Shin-Kokuritsu). The travel time calculation unit 113 then recalculates expected travel times of the seven candidate vehicles to the single location.

Subsequently, the optimal destination determination unit 115 recalculates an optimal solution of the combinations of the seven candidate vehicles and the single location. The optimal solution thus recalculated is the same combinations "Vehicle A→Shin-Kokuritsu" and "Vehicle B→Shin-Kokuritsu" as in FIG. 9 (10 minutes ago). The dispatch command sending unit 116 therefore does not send any route change command etc.

FIG. 11 shows the state after 1 minute from FIG. 10. As shown in the figure, Vehicle A and Vehicle B are still heading to Shin-Kokuritsu, but a new actual demand has occurred because User A at Budokan has made a dispatch request as "he/she wants to go back to Hotel A." A row and columns corresponding to User A are therefore added to the table as shown in the table on the lower side in FIG. 11.

At the time of FIG. 11, the candidate vehicle selection unit 112 receives actual demand information from the actual demand collection devices 32 and selects seven candidate vehicles (Vehicle A, Vehicle B, and the five vehicles 2 on standby at the depot) that can be dispatched to two locations (Shin-Kokuritsu, Budokan). The travel time calculation unit 113 then calculates expected travel times of the seven candidate vehicles to the two locations.

Subsequently, the wait time calculation unit 114 calculates expected wait time of one user (User A). The optimal destination determination unit 115 then recalculates an optimal solution of the combinations of the seven candidate vehicles and the two locations. The optimal solution thus recalculated is the combinations "Vehicle B→Shin-Kokuritsu," "the vehicle 2 on standby at the depot→Shin-Kokuritsu," and "Vehicle A→Budokan (User A)." The dispatch command sending unit 116 therefore sends a dispatch command to one of the vehicles 2 on standby at the depot to dispatch this vehicle 2 to Shin-Kokuritsu and sends a dispatch command (route change command) to Vehicle A heading to Shin-Kokuritsu to reroute Vehicle A to Budokan.

Figure 12:
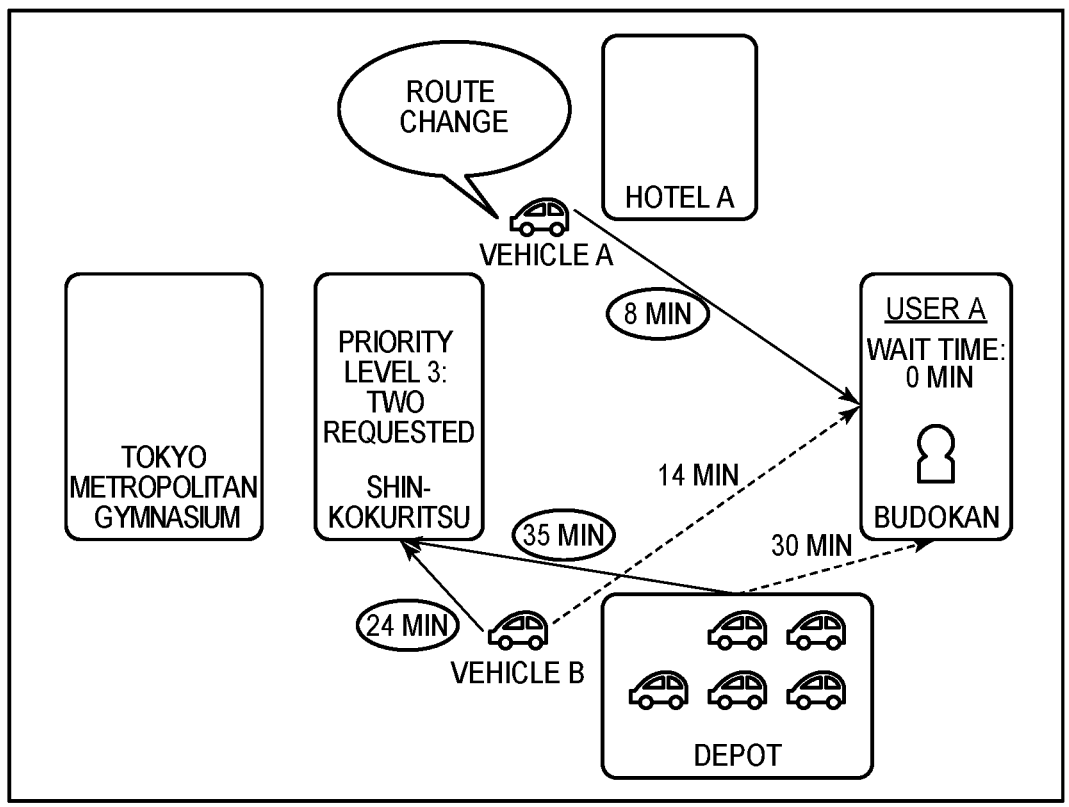
FIG. 12 shows the specific example of the vehicle dispatch instruction method that is performed by the vehicle dispatch instruction device according to the embodiment of the present disclosure, showing the state after 1 minute from FIG. 10.

That is, if any actual demand occurs in addition to potential demands, the vehicle dispatch instruction device 1 give higher priority on the actual demand over the potential demands, and as shown in FIG. 12, sends a route change command to Vehicle A, which was going to be added to Shin-Kokuritsu, to reroute Vehicle A to Budokan. Instead of Vehicle A, the vehicle dispatch instruction device 1 adds another vehicle 2 on standby at the depot to Shin-Kokuritsu. Vehicle B is still sent to Shin-Kokuritsu.

In the vehicle dispatch instruction device 1, the vehicle dispatch instruction method, and the vehicle dispatch instruction program according to the above embodiment, specific vehicles 2 are not matched with dispatch requests from users, but the combinations of locations and vehicles 2 which minimize the sum of users' expected wait times are repeatedly calculated and determined at predetermined time intervals, and dispatch commands are sent to the vehicles 2 based on the determined combinations. Accordingly, in case of unforeseen events, such as if a vehicle 2 being sent to a certain location gets caught in traffic or if any trouble occurs to the driver of such a vehicle 2, a different vehicle 2 located nearby can be sent to that location instead of that vehicle 2. The vehicle dispatch instruction device 1, the vehicle dispatch instruction method, and the vehicle dispatch instruction program according to the above embodiment therefore can restrain an increase in wait time of the users and reduce the wait times of the users even in case of unforeseen events.

In the vehicle dispatch instruction device 1, the vehicle dispatch instruction method, and the vehicle dispatch instruction program according to the above embodiment, the problem of determining the combinations of a plurality of candidate vehicles and a plurality of locations is formulated as a linear programming problem, and the combinations minimizing the sum of expected wait times of users can be easily determined by obtaining an optimal solution. In the vehicle dispatch instruction device 1, the vehicle dispatch instruction method, and the vehicle dispatch instruction program according to the above embodiment, the vehicles 2 are dispatched in view of potential demands at each location in addition to actual demands that are actual dispatch requests from users. The vehicle dispatch instruction device 1, the vehicle dispatch instruction method, and the vehicle dispatch instruction program according to the above embodiment can therefore deal with unexpected demands that occur at each location.

In the vehicle dispatch instruction device 1, the vehicle dispatch instruction method, and the vehicle dispatch instruction program according to the above embodiment, specific vehicles 2 are not strongly matched with dispatch requests, but dispatch commands are sent to the vehicles in a more flexible manner. Namely, when dispatching the vehicles 2, only information on the location where a demand has occurred is sent to each vehicle 2. Accordingly, the vehicles 2 can also be efficiently matched with uncertain demands (potential demands).

The vehicle dispatch instruction device 1, the vehicle dispatch instruction method, and the vehicle dispatch instruction program according to the above embodiment can flexibly deal with most situations that occur during traveling of the vehicles 2, such as when the vehicle 2 gets caught in traffic, when the need arises for the driver to rest, refuel the vehicle 2, make a stop while driving, etc. The vehicle dispatch instruction device 1, the vehicle dispatch instruction method, and the vehicle dispatch instruction program according to the above embodiment can automatically deal with unexpected troubles.

The vehicle dispatch logic (selection of a plurality of candidate vehicles, calculation of expected travel times, calculation of expected wait times, and determination of combinations as shown in FIG. 3) of the vehicle dispatch instruction device 1, the vehicle dispatch instruction method, and the vehicle dispatch instruction program according to the above embodiment can optimize the overall wait times of users when the number of vehicles 2 that can be supplied is larger than the amount of actual demand (supply>demand). Accordingly, if the amount of actual demand momentarily becomes larger than the number of vehicles 2 that can be supplied during actual processing, the vehicle dispatch logic is executed by excluding those actual demands with short wait times out of all actual demands (namely, on the assumption that those actual demands with short wait times are not present). This allows the vehicles 2 to be quickly assigned to those actual demands with long wait times.

When creating a matrix for solving a linear programming program shown on the lower side in each of FIGS. 4 to 11, "a logic dummy standby vehicle×a huge number" is added, in practice, to the combinations shown in each of these figures. Due to such logic dummy standby vehicles, even if the amount of demand (the amount of actual demand) becomes larger than the amount of supply (the number of vehicles 2 that can be supplied), the solution of the linear programming problem does not become "none" (error) and a process that does not allow dispatch commands to be sent to the logic dummy vehicles according to <11> need only be performed. Costs for the logic dummy vehicles are set to a large value so that the logic dummy vehicles are least likely to be selected as candidate vehicles. Because of the logic dummy vehicles, even if, e.g., a large amount of potential demand is added to actual demand, priority is given to the actual demand and any remaining vehicles 2 will be used for the potential demand. This can prevent a precise number of vehicles 2 from being assigned to potential demand that is not completely accurate.

The vehicle dispatch instruction device, the vehicle dispatch instruction method, and the vehicle dispatch instruction program according to the present disclosure are specifically described above based on the mode for carrying out the present disclosure. However, the present disclosure is not limited to the above description and should be broadly interpreted based on the description of the claims. It should be understood that the present disclosure is intended to cover various modifications, alterations, etc. that are made based on the description given herein.

For example, the above vehicle dispatch instruction device 1 calculates an objective function by using actual demand costs and potential demand costs. However, the vehicle dispatch instruction device 1 may calculate an objective function in view of the number of destination changes by each driver in addition to the actual demand costs and the potential demand costs. In this case, if the destination is changed in response to a route change command as in, e.g., Vehicle A shown in FIGS. 11 and 12, the optimal destination determination unit 115 adds a predetermined "route change cost" to the actual demand cost or potential demand cost for Vehicle A and calculates an objective function. Accordingly, the more the destination of a vehicle 2 is changed, the less likely this vehicle 2 is to be selected as an optimal solution of the combinations. The destination of the same vehicle 2 therefore will not be changed many times, which reduces the driving burden on the driver.

The above vehicle dispatch instruction device 1 is described based on the assumption that the locations, which are preset places, are dispatch destinations of the vehicles 2. However, for example, in the case where users have a communication terminal with a GPS receiving function, etc. and demands from the users can be directly specified, the users, namely "moving demands," may be dispatch destinations of the vehicles 2.

The above vehicle dispatch instruction device 1 is described based on the assumption that it sends dispatch commands in the situations where the vehicles 2 run between a plurality of event venues to pick up and drop off the users. However, the present disclosure is also applicable to, e.g., dispatch commands for autonomous mobile shop vehicles, dispatch commands for logistics trucks, dispatch commands for in-house logistics in logistics centers using super heavy-duty racks, etc.

Further effects and modifications will readily occur to those skilled in the art. The broader aspects of the present disclosure are not limited to such specific details and a representative embodiment as given and illustrated above. Various modifications can therefore be made without departing from the spirit and scope of the overall concept of the present disclosure as defined by the appended claims and their equivalents.

What is claimed is:

1. A vehicle dispatch instruction device, comprising:
a memory; and
a processor including hardware, wherein
the processor is configured to receive, from a plurality of movable bodies, position information of the movable bodies that is information on a current position of each movable body,
the processor is configured to receive, from information communication devices corresponding to a plurality of users at a plurality of locations that are dispatch destinations of the movable bodies, actual demand information including a time of a dispatch request made by each user of the plurality of users and a corresponding location name of a corresponding location of the plurality of locations,
the processor is configured to determine potential demand information corresponding to a number of movable bodies potentially needed at each of the plurality of locations,
the processor is configured to select, from the plurality of movable bodies, a plurality of candidate movable bodies that are able to be dispatched to a plurality of the locations included in the actual demand information based on the actual demand information and the potential demand information, the actual demand information being prioritized over the potential demand information in selecting the plurality of candidate movable bodies,
the processor is configured to calculate, based on the position information, expected travel times of the plurality of candidate movable bodies from their current positions to the plurality of locations,
the processor is configured to calculate an expected wait time of each user based on the actual demand information and the expected travel times,
the processor is configured to determine combinations that minimize a sum of the users' expected wait times out of combinations of the plurality of locations and the plurality of candidate movable bodies,
the processor is configured to send a dispatch command to each target movable body that is a target to which the dispatch command is sent based on the determined combinations, and
the processor is configured to repeat at predetermined time intervals the selection of the plurality of candidate movable bodies, the calculation of the expected travel times, the calculation of the expected wait times, and the determination of the combinations,
wherein the processor is further configured to:
calculate expected travel times of the plurality of candidate movable bodies from their current positions to the plurality of locations, based on the position information,
calculate an actual demand cost, which is the expected wait time of each user, based on the actual demand information and the expected travel times,
calculate a potential demand cost by adding a predetermined value larger than a maximum value of the actual demand costs to a value resulting from dividing the expected travel time to the location included in the potential demand information by a predetermined value indicating a weight of potential demand with respect to actual demand,
formulate a problem of determining the combinations of the plurality of locations and the plurality of candidate movable bodies as a linear programming problem in which an objective function is a sum of products of a plurality of variables representing the combinations of the plurality of locations and the plurality of candidate movable bodies multiplied by the actual demand costs and the potential demand costs, and
wherein the variables that satisfy a first constraint and a second constraint and minimize the objective function, the first constraint being the number of movable bodies requested by the users and the number of movable bodies included in the potential demand information, and the second constraint being the number of movable bodies that are able to be dispatched to the plurality of locations.

2. The vehicle dispatch instruction device according to claim 1, wherein:

the processor is configured to formulate a problem of determining the combinations of the plurality of locations and the plurality of candidate movable bodies as a linear programming problem in which an objective function is a sum of products of a plurality of variables representing the combinations of the plurality of locations and the plurality of candidate movable bodies multiplied by the users' expected wait times of each combination; and the processor is configured to determine the combinations that minimize the sum of the users' expected wait times by determining the variables that satisfy a first constraint and a second constraint and minimize the objective function, the first constraint being the number of movable bodies requested by the users, and the second constraint being the number of movable bodies that are able to be dispatched to the plurality of locations.

3. The vehicle dispatch instruction device according to claim 1, wherein the potential demand information includes first potential demand information determined based on a number of movable bodies set for each of the plurality of locations, and second potential demand information based on the time of dispatch request made by each user of the plurality of users and a number of people at the corresponding location.

4. The vehicle dispatch instruction device according to claim 3, wherein the number of people at the corresponding location is determined by a demand collection device.

5. The vehicle dispatch instruction device according to claim 4, wherein the demand collection device includes a device configured to record entries to the corresponding location.

6. The vehicle dispatch instructions device according to claim 3, wherein the first potential demand information is prioritized over the second potential demand information.

7. A vehicle dispatch instruction method that is performed by using a vehicle dispatch instruction device including a processor, the vehicle dispatch instruction method comprising:

receiving, from a plurality of movable bodies, position information of the movable bodies that is information on a current position of each movable body by using the processor;

receiving, from information communication devices corresponding to a plurality of users at a plurality of locations that are dispatch destinations of the movable bodies, actual demand information including a time of a dispatch request made by each user of the plurality of users and a corresponding location name of a corresponding location of the plurality of locations by using the processor;

determining, using the processor, potential demand information corresponding to a number of movable bodies potentially needed at each of the plurality of locations;

selecting, from the plurality of movable bodies and using the processor, a plurality of candidate movable bodies that are able to be dispatched to a plurality of the locations included in the actual demand information based on the actual demand information and the potential demand information, the actual demand information being prioritized over the potential demand information in selecting the plurality of candidate movable bodies;

calculating, based on the position information, expected travel times of the plurality of candidate movable bodies from their current positions to the plurality of locations by using the processor;

calculating an expected wait time of each user based on the actual demand information and the expected travel times and determining combinations that minimize a sum of the users' expected wait times out of combinations of the plurality of locations and the plurality of candidate movable bodies by using the processor;

sending a dispatch command to each target movable body that is a target to which the dispatch command is sent based on the determined combinations by using the processor; and repeating at predetermined time intervals the selection of the plurality of candidate movable bodies, the calculation of the expected travel times, the calculation of the expected wait times, and the determination of the combinations by using the processor, wherein the method further includes:

calculating expected travel times of the plurality of candidate movable bodies from their current positions to the plurality of locations, based on the position information, calculating an actual demand cost, which is the expected wait time of each user, based on the actual demand information and the expected travel times, calculating a potential demand cost by adding a predetermined value larger than a maximum value of the actual demand costs to a value resulting from dividing the expected travel time to the location included in the potential demand information by a predetermined value indicating a weight of potential demand with respect to actual demand, formulating a problem of determining the combinations of the plurality of locations and the plurality of candidate movable bodies as a linear programming problem in which an objective function is a sum of products of a plurality of variables representing the combinations of the plurality of locations and the plurality of candidate movable bodies multiplied by the actual demand costs and the potential demand costs, and wherein the variables that satisfy a first constraint and a second constraint and minimize the objective function, the first constraint being the number of movable bodies requested by the users and the number of movable bodies included in the potential demand information, and the second constraint being the number of movable bodies that are able to be dispatched to the plurality of locations.

8. A non-transitory readable recording medium in which a program for causing a processor to perform a method for controlling a vehicle dispatch instruction device including the processor is stored, the program causing the processor to perform a control process for controlling the vehicle dispatch instruction device, the control process comprising:

receiving, from a plurality of movable bodies, position information of the movable bodies that is information on a current position of each movable body;

receiving, from information communication devices corresponding to a plurality of users at a plurality of locations that are dispatch destinations of the movable bodies, actual demand information including a time of a dispatch request made by each user of the plurality of users and a corresponding location name of a corresponding location of the plurality of locations;

determining potential demand information corresponding to a number of movable bodies potentially needed at each of the plurality of locations;

selecting, from the plurality of movable bodies, a plurality of candidate movable bodies that are able to be dispatched to a plurality of the locations included in the actual demand information based on the actual demand information and the potential demand information, the actual demand information being prioritized over the potential demand information in selecting the plurality of candidate movable bodies;

calculating, based on the position information, expected travel times of the plurality of candidate movable bodies from their current positions to the plurality of locations;

calculating an expected wait time of each user based on the actual demand information and the expected travel times and determining combinations that minimize a sum of the user's expected wait times out of combinations of the plurality of locations and the plurality of candidate movable bodies;

sending a dispatch command to each target movable body that is a target to which the dispatch command is sent based on the determined combinations; and repeating at predetermined time intervals the selection of the plurality of candidate movable bodies, the calculation of the expected travel times, the calculation of the expected wait times, and the determination of the combinations, wherein the process further includes:

calculating expected travel times of the plurality of candidate movable bodies from their current positions to the plurality of locations, based on the position information, calculating an actual demand cost, which is the expected wait time of each user, based on the actual demand information and the expected travel times, calculating a potential demand cost by adding a predetermined value larger than a maximum value of the actual demand costs to a value resulting from dividing the expected travel time to the location included in the potential demand information by a predetermined value indicating a weight of potential demand with respect to actual demand, formulating a problem of determining the combinations of the plurality of locations and the plurality of candidate movable bodies as a linear programming problem in which an objective function is a sum of products of a plurality of variables representing the combinations of the plurality of locations and the plurality of candidate movable bodies multiplied by the actual demand costs and the potential demand costs, and wherein the variables that satisfy a first constraint and a second constraint and minimize the objective function, the first constraint being the number of movable bodies requested by the users and the number of movable bodies included in the potential demand information, and the second constraint being the number of movable bodies that are able to be dispatched to the plurality of locations.

* * * * *